US008521875B2

(12) United States Patent
Dutt et al.

(10) Patent No.: US 8,521,875 B2
(45) Date of Patent: Aug. 27, 2013

(54) IDENTITY FOR DATA SOURCES

(75) Inventors: Bala Dutt, Bangalore (IN); Ajay Kumar, Bangalore (IN); Venugopal Rao K, Karnataka (IN); Sankara R. Bhogi, Bangalore (IN); Srinivasan Kannan, Bangalore (IN)

(73) Assignee: Oracle America, Inc., Redwood City, CA (US)

( * ) Notice: Subject to any disclaimer, the term of this patent is extended or adjusted under 35 U.S.C. 154(b) by 3661 days.

(21) Appl. No.: 10/655,346

(22) Filed: Sep. 4, 2003

(65) Prior Publication Data
US 2005/0055325 A1    Mar. 10, 2005

(51) Int. Cl.
*G06F 15/173* (2006.01)
*G06F 15/16* (2006.01)
*G06F 7/00* (2006.01)

(52) U.S. Cl.
USPC ........... 709/225; 709/223; 709/203; 707/607; 707/609

(58) Field of Classification Search
USPC ................. 709/225, 223, 203; 707/607, 609
See application file for complete search history.

(56) References Cited

U.S. PATENT DOCUMENTS

| | | |
|---|---|---|
| 4,502,116 A | 2/1985 | Fowler et al. |
| 5,335,343 A | 8/1994 | Lampson et al. |
| 5,504,899 A | 4/1996 | Raz |
| 5,504,900 A | 4/1996 | Raz |
| 5,586,312 A | 12/1996 | Johnson et al. |
| 5,630,081 A | 5/1997 | Rybicki et al. |
| 5,701,480 A | 12/1997 | Raz |
| 6,011,791 A | 1/2000 | Okada et al. |
| 6,038,587 A | 3/2000 | Phillips et al. |
| 6,041,354 A | 3/2000 | Biliris et al. |
| 6,105,067 A | 8/2000 | Batra |
| 6,154,787 A | 11/2000 | Urevig et al. |
| 6,157,927 A | 12/2000 | Schaefer et al. |
| 6,233,587 B1 | 5/2001 | Tandon |
| 6,243,737 B1 | 6/2001 | Flanagan et al. |
| 6,272,675 B1 | 8/2001 | Schrab et al. |
| 6,317,773 B1 | 11/2001 | Cobb et al. |
| 6,338,112 B1 | 1/2002 | Wipfel et al. |

(Continued)

OTHER PUBLICATIONS

Manolis Marazakis, "Distributed Systems", University of Crepe; Sep. 2002, pp. 1-31.

(Continued)

*Primary Examiner* — Backhean Tiv
*Assistant Examiner* — Alan S Chou
(74) *Attorney, Agent, or Firm* — Robert C. Kowert; Meyertons, Hood, Kivlin, Kowert & Goetzel, P.C.

(57) ABSTRACT

Various embodiments of a networked computer system in which an application server associates an identity with each data source included in the system are disclosed. The networked computer system may include several backend systems, each including one or more data resources, and the identity of a data source may be unique to a data resource. When an application requests a connection to a data resource, the application server may ascertain the identity of the associated data source and compare this identity to identities of data sources with existing connections. If a match is found, the application server may provide an existing connection to the application, whereas if no match is found the application server may provide a new connection. The identity of a data source may include one or more data source configuration properties. In some embodiments, the identity may include database name, URL, and user name.

23 Claims, 8 Drawing Sheets

(56) References Cited

U.S. PATENT DOCUMENTS

| | | | |
|---|---|---|---|
| 6,374,243 B1 | 4/2002 | Kobayashi et al. | |
| 6,411,956 B1* | 6/2002 | Ng | 707/10 |
| 6,421,661 B1 | 7/2002 | Doan et al. | |
| 6,421,688 B1 | 7/2002 | Song | |
| 6,442,618 B1 | 8/2002 | Phillips et al. | |
| 6,496,828 B1 | 12/2002 | Cochrane et al. | |
| 6,519,679 B2 | 2/2003 | Devireddy et al. | |
| 6,687,729 B1 | 2/2004 | Sievert et al. | |
| 6,687,831 B1* | 2/2004 | Albaugh et al. | 726/7 |
| 6,704,737 B1 | 3/2004 | Nixon et al. | |
| 6,728,958 B1 | 4/2004 | Klein et al. | |
| 6,832,238 B1 | 12/2004 | Sharma et al. | |
| 6,854,646 B2 | 2/2005 | Ieshima et al. | |
| 6,862,573 B2 | 3/2005 | Kendall et al. | |
| 6,873,995 B2 | 3/2005 | Benson et al. | |
| 6,950,848 B1* | 9/2005 | Yousefi'zadeh | 709/203 |
| 6,981,221 B2 | 12/2005 | Neudeck et al. | |
| 7,065,563 B2 | 6/2006 | Islam et al. | |
| 7,080,119 B2* | 7/2006 | Felt et al. | 709/203 |
| 7,082,432 B2 | 7/2006 | Bhogi et al. | |
| 7,089,566 B1* | 8/2006 | Johnson | 719/328 |
| 7,134,008 B2 | 11/2006 | Dutt et al. | |
| 7,165,061 B2 | 1/2007 | K et al. | |
| 2002/0124083 A1 | 9/2002 | Jeyaraman et al. | |
| 2003/0033398 A1 | 2/2003 | Carlson et al. | |
| 2003/0036919 A1 | 2/2003 | Felt et al. | |
| 2003/0046342 A1 | 3/2003 | Felt et al. | |
| 2003/0055968 A1 | 3/2003 | Hochmuth et al. | |
| 2004/0030739 A1* | 2/2004 | Yousefi'zadeh | 709/201 |
| 2004/0088413 A1 | 5/2004 | Bhogi et al. | |
| 2004/0153349 A1 | 8/2004 | K. et al. | |
| 2004/0153383 A1 | 8/2004 | K. et al. | |
| 2004/0153450 A1 | 8/2004 | K. et al. | |
| 2004/0172385 A1 | 9/2004 | Dayal | |
| 2004/0215473 A1 | 10/2004 | Bhogi et al. | |
| 2004/0215894 A1 | 10/2004 | Bhogi et al. | |
| 2004/0216109 A1 | 10/2004 | Bhogi et al. | |
| 2005/0015353 A1 | 1/2005 | Kumar et al. | |
| 2005/0015425 A1 | 1/2005 | Kumar et al. | |
| 2005/0055324 A1 | 3/2005 | Godeby et al. | |
| 2005/0066155 A1 | 3/2005 | Dutt et al. | |

OTHER PUBLICATIONS

Oracle9i JDBC Developer's Guide and Reference (Mar. 2002, retrieved from http://www.stanford.edu/dept/itss/docs/oracle/9i/java.920/a96654/toc.htm on Sep. 6, 2005).

Kannegaard (J2EE BluePrints, Mar. 20, 2000 retrieved from http://java.sun.com/blueprints/guidelines/designing_enterprise_applications/apmTOC.html on Sep. 6, 2005).

BEA WebLogic Enterprise 5.1, BEA Systems, Inc., 2000, (13 Pages).

"Simplified Guide to the Java TM 2 Platform Enterprise Edition," Sun Microsystems, Inc., 1999, (13 Pages).

Dogac et al., "METU Interoperable Database System," Demo Description, In Proc. of ACM Sigmod Intl. Conf. on Management of Data, Jun. 1996, (6 Pages).

"Interface DataSource," DataSource (Java 2 Platform, SE v1.4.1), 2002, (1 Page).

"Initial Context," JNDI 1.2.1 Specification: Class Initial Context, http://java.sun.com/products/jndi/1.2/javadoc/javax/naming/InitialContext.html, Jul. 14, 1999, (1 Page).

JNDI—Java™ Naming & Directory Interface™, Sun Microsystems, Inc., http://java.sun.com/jndi, May 15, 2003, (2 Pages).

"iPlanet Application Server 6.0 Administration Guide: Chapter 9 Administering Transactions," http://docs.sun.com/source/816-5784-10/adtrans.htm, Sep. 5, 2000, (11 Pages).

Breitbart et al., "Replication and Consistency Being Lazy Helps Sometimes," PODS '97, Jun. 1997, (pp. 173-184).

Patricia Serrano-Alvarado et al."Mobile Transaction Supports for DBMS". In 17ièmes Journées Bases de Données Avancées, Agadir, Maroc, Oct. 2001, (19 Pages).

Liu et al., "Designing a Test Suite for Empirically-based Middleware Performance Prediction," Australian Computer Society, Inc., (2002), (8 Pages).

"Java ™ 2SDK, Enterprise Edition 1.3.1 Configuration Guide," http://java.sun.som/j2ee/sdk_1.3/techdocs/release/ConfigGuide.html, Jan. 3, 2002, ( 16 Pages).

Ellis et al., :JDBC ™ 3.0 Specification—Final Release, Sun Microsystems, Inc., Oct. 2001, (190 pages).

"iPlanet Application Server 6.0 Administration Guide: Chapter 4 Logging Server Messages," http://docs.sun.com/source/816-5720-10/adlog.htm, Sep. 5, 2000, (21 Pages).

"JDBC ™ Data Access API—The JDBC API Universal Data Acess for the Enterprise," java.sun.com, Aug. 10, 2003, (5 Pages).

"Connection Pooling," Advanced Programming for the Java 2 Platform, Aug. 16, 2002, (4 Pages).

Siva Visveswaram, "Manage Acess to Shared, Server-Side Resources for High Performance—Dive Into Connection Pooling with J2EE," JavaWorld, Oct. 2000, (8 Pages).

* cited by examiner

IDENTITY FOR DATA SOURCES

BACKGROUND OF THE INVENTION

1. Field of the Invention

The invention relates to computer systems and computer software, and more particularly to identifying data sources in computer systems.

2. Description of the Related Art

Large business systems may include application servers that run multiple applications and/or multiple copies of the same application concurrently. Some or all of these applications may be transaction oriented and may be capable of conducting many transactions simultaneously. Each transaction may require at least one connection for each data resource to be accessed and each connection requires a certain amount of system resources. Given the potentially large number of data resources and applications involved in transactions, the amount of system resources devoted to connections required to support the transactions could be substantial.

Data sources in Java Database Connectivity (JDBC) are the connection factories through which connections to different databases may be obtained. The function of these data source objects is to hide backend database configuration specific details from the application and offer a uniform interface for obtaining connections, as defined in the JDBC specifications. For example, when it is determined that an application needs to communicate with a specific database resident on a backend system, the application server may typically instantiate a data source object corresponding to the database. The data source object may be associated with a connection pool including one or more connections to the database. In order to minimize the amount of database configuration specific information required by an application in order to obtain a connection, both the data source object and the application may use an abstract name to refer to the database. In this way, a developer writing application code may only need to know the abstract name for a database in order to obtain a connection to it.

Typically to obtain a connection to a database where my_database is an abstract name referring to a specific database on a backend system, application code would create a datasource object with my_database and call get_connection on the object. The data source object associated with the abstract name, my_database, will supply a connection to the desired database corresponding to the abstract name. A Java code example is as follows:

DataSource ds=new DataSource(abstract_name);
ds.getconnection( );

Some applications may be large and complex and may be implemented by more than one developer. As a developer implements communications in a particular portion of an application, he may use abstract names to refer to the data sources that are to be accessed. These abstract names often aid the developer in recalling some characteristic of the data to be accessed. Developers implementing different portions of an application may use different abstract names for the same data resource.

In a typical application server, a separate data source object is instantiated for each abstract name of a data resource to be accessed by an application. For example, a company may have a database for storing human resources (HR) information resident on a backend system. A large application for manipulating the HR information may be written by several developers. One section of the application written by a first developer may require access to employee name information from the HR database and may use the abstract name "employee_names" to obtain a connection to the HR database. Another section of the application written by a second developer may require access to employee serial number information from the HR database and may use the abstract name "empnumber" to obtain a connection. Yet another section of the application written by a third developer may require access to employee salary information from the HR database and may use the abstract name "salary" to obtain a connection.

When the application is executed, the three sections obtain three different connections from data source objects associated with the three different abstract names corresponding to the singular HR database. This situation results in an inefficient use of system communication resources due to the lack of a standard method for discovering whether multiple data source entities refer to the same backend data resource.

For a transactional application this connection redundancy can result in the use of a more burdensome two-phase commit protocol, when if it were known that all connections were with the same data resource, a less-costly single-phase commit protocol could be used.

SUMMARY

Various embodiments of a networked computer system in which an application server associates an identity with each data source included in the system are disclosed. The networked computer system may include several backend systems, each including one or more data resources, and the identity of a data source may be unique to a data resource. When an application requests a connection to a data resource, the application server may ascertain the identity of the associated data source and compare this identity to identities of data sources with existing connections. If a match is found, the application server may provide an existing connection to the application, whereas if no match is found the application server may provide a new connection. The identity of a data source may include one or more data source configuration parameters. In some embodiments, the identity may include database name, uniform resource locator (URL), and user name.

In one embodiment, the data sources may be Java Data Base Connectivity (JDBC) DataSources and may be connection factories through which connection to different data resources (e.g. data bases) can be retrieved. These DataSource objects may hide data base specific configuration and offer a uniform interface for getting new connections as defined in JDBC. A global data source may be an XADataSource similar to a DataSource except that it is used to retrieve XAConnections. As described below, a unique identity may be established across DataSource and XADataSource objects and may be used to determine if two data source entities refer to the same backend data resource in order to facilitate connection sharing. By determining data source identities, a connection once retrieved from a data source may be shared across multiple uses in an application or transaction.

The identity of both local and global data sources may be defined by a subset of properties used to configure the data source. For example, when a driver for a data base is specified, a subset of properties may be linked as that data source's identity. In one embodiment, the subset of properties may be data base name, URL and user name.

For data sources participating in a transaction, the identity of each requested data source may be compared to the identities of any data sources already participating in the transaction. If a match is found, the existing data source connection is used by the application. This may allow some transaction to be treated as local transactions (and thus use a more efficient commit protocol) that otherwise would have been treated as global transactions.

BRIEF DESCRIPTION OF THE DRAWINGS

A better understanding of the present invention can be obtained when the following detailed description is considered in conjunction with the following drawings, in which.

Figure 1:
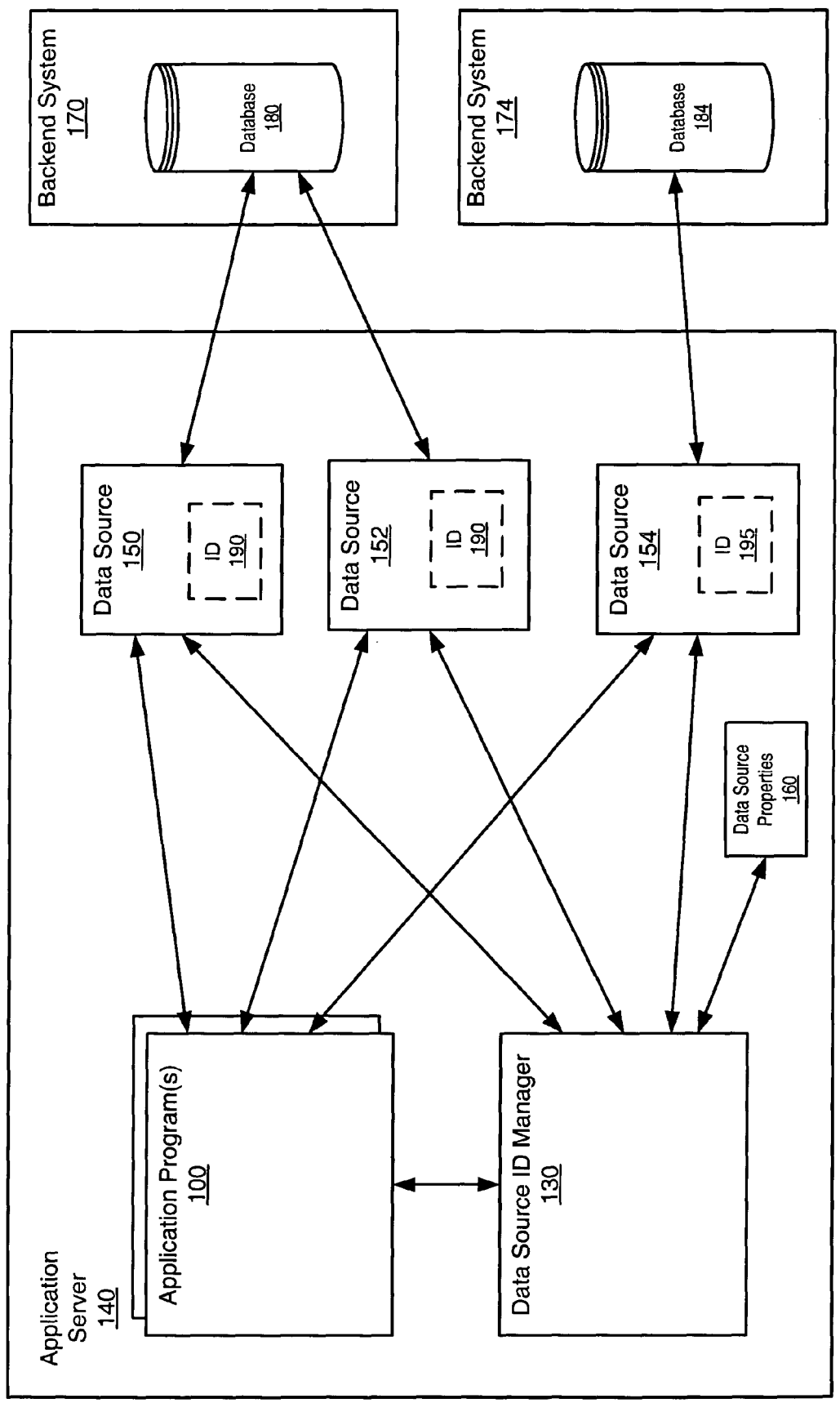
FIG. 1 illustrates components of an application server, according to one embodiment.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must). The term "include" and derivations thereof mean "including, but not limited to." The term "connected" means "directly or indirectly connected," and the term "coupled" means "directly or indirectly coupled."

DETAILED DESCRIPTION OF EMBODIMENTS

FIG. 1 is a block diagram illustrating components of application server 140, according to one embodiment. Application server 140 may include application program(s) 100, data source ID manager 130, data source objects 150, 152, and 154, and data source properties 160, among other components. Typically, an application server 140 may include a data source for each abstract name for a data resource with which application programs 100 requires communication. Some data sources may provide only local connections. Such data sources may be referred to as local data sources. A local connection, for example may be used in transactions involving only one data resource. For example, data source 150 may provide local connections to database 180 resident on backend system 170. Other data sources may provide global connections, or both global and local connections. Such data sources may be referred to as global data sources. Global connections may be used, for example, in transactions involving multiple distinct data resources. Data source 152 may be an XA data source supporting distributed transactions and providing global XA connections, which are also associated with database 180 resident on backend system 170.

In one embodiment, the data sources may be Java Data Base Connectivity (JDBC) DataSources and may be connection factories through which connection to different data resources (e.g. data bases) can be retrieved. These DataSource objects may hide data base specific configuration and offer a uniform interface for getting new connections as defined in JDBC. A global data source may be an XADataSource similar to a DataSource except that it is used to retrieve XAConnections. As described below, a unique identity may be established across DataSource and XADataSource objects and may be used to determine if two data source entities refer to the same backend data resource in order to facilitate connection sharing. By determining data source identities, a connection once retrieved from a data source may be shared across multiple uses in an application or transaction.

The identity of both local and global data sources may be defined by a subset of properties used to configure the data source. For example, when a driver for a data base is specified, a subset of properties may be linked as that data source's identity.

For data sources participating in a transaction, the identity of each requested data source may be compared to the identities of any data sources already participating in the transaction. If a match is found, the existing data source connection is used by the application. This may allow some transaction to be treated as local transactions (and thus use a more efficient commit protocol) that otherwise would have been treated as global transactions.

In some embodiments, a data source ID manager 130 may be included to determine data source identities. For example, an application 100 may request a connection with a data resource 180 according to an abstract name associated with the data resource. The application may specify a data source to provide the connection. Data source ID manager 130 may receive or intercept the application request and determine a unique data source ID for the specified data source. In one embodiment, data source ID manager 130 may determine the data source ID from a set of data source properties for the specified data source. In one embodiment, a configuration utility may have been used to configure the data sources and to indicate which data source properties 160 should be used to uniquely identify each data source. Data source ID manage 130 may determine which data sources have the same data source identity. For example, data sources 150 and 152 may both have data source identity 190 and therefore, may both be capable of supplying connections to the same data resource.

Data source ID manager 130 may determine whether any data source having a matching data source ID has previously supplied a connection of the requested type that is still available to the application, and if so, return or cause to be returned the previously supplied connection to the application. For example, for a request to access database 180, if a connection has previously been supplied from either data source 150 or 152, the data source ID manager may return this connection to the application. If no connection exists, data source ID manager 130 may cause the appropriate data source to obtain a new connection.

Figure 2:
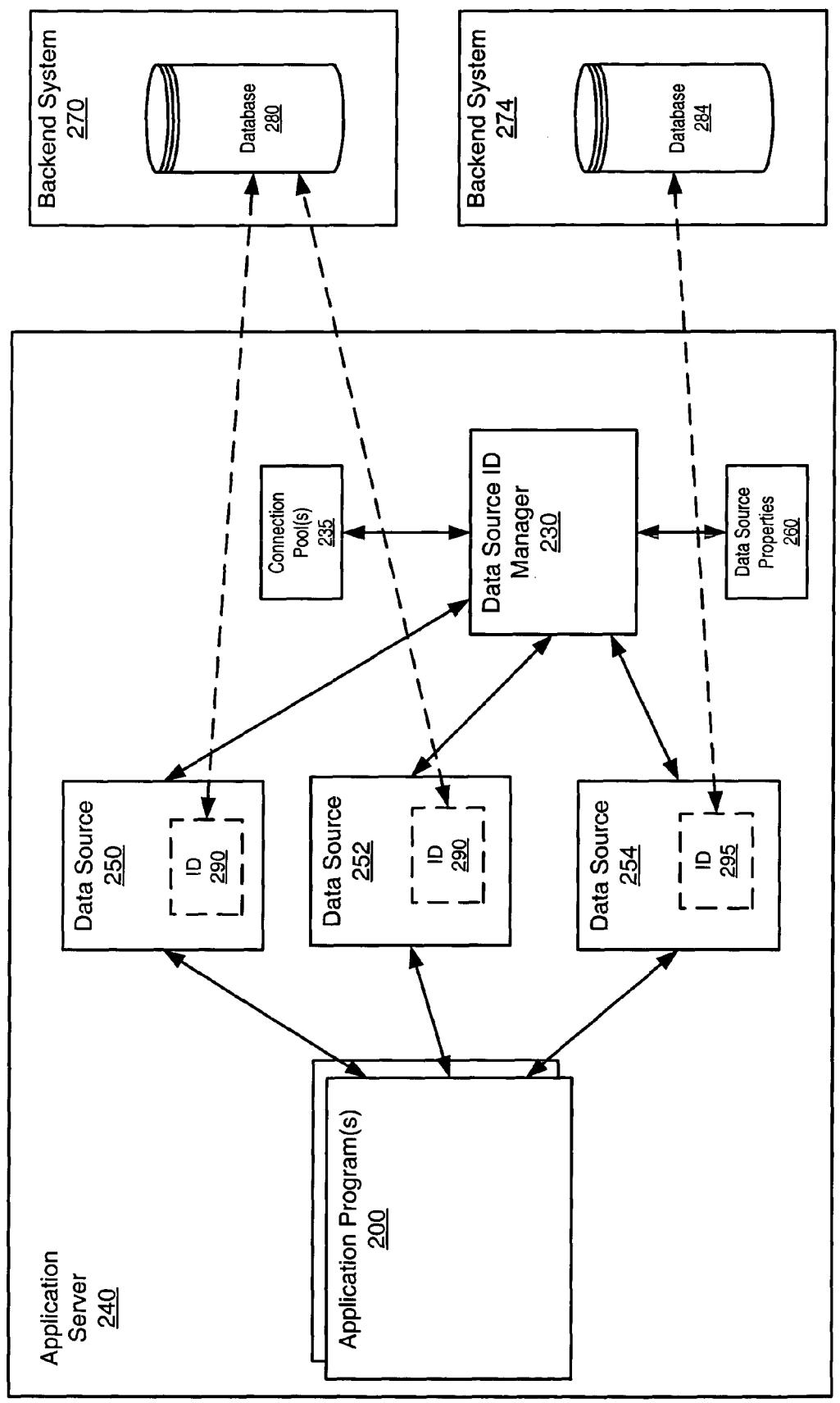
FIG. 2 illustrates components of an application server, according to another embodiment.

In other embodiments, as depicted in FIG. 2 the data source ID manager may intercept connection requests from data sources to a connection repository of the application server, e.g. connection pool 235. If an application 200 requests a connection with a data resource 280 according an abstract name associated with the data resource from data source 250, data source 250 may return a connection to the application in response to the request. To return the connection, data source 250 may request a connection to data resource 280 from connection pool 235. Data source ID manager 230 may receive or intercept the request and determine a unique ID for the data source. In one embodiment, data source ID manager 230 may use a particular set of data source properties to determine a data source identity 290 associated with the request and determine which other data sources have the same data source identity 290. For example, data source 252 may also have data source identity 290 and therefore, may be capable of supplying connections of the requested type.

Data source ID manager 230 may determine whether a data source with a matching ID, e.g. data source 252, has previously supplied a connection that is still active of the requested type to the application. If a connection has previously been supplied from data source 252, the data source ID manager may return or cause to be returned this connection to data source 250 to be sent to the application. If no connection has been supplied previously, data source ID manager 230 may forward the connection request to connection pool 235 for a new connection. By sharing previously supplied connections, across data sources with matching data source identities, the data source ID manager 130 may eliminate redundant connections.

In still other embodiments, upon receiving a request for a connection, data source ID manager may determine a unique data source identity associated with the request (e.g. from a predetermined set of properties for that data source), as described above. The data source ID manager may compare the data source identity associated with the request with the identities of available data sources to determine whether a data source exists that is capable of supplying connections of the requested type. If no such data source exists, the data source ID manager may instantiate a data source associated with the abstract name to supply the necessary connection. If a data source with a matching data source ID already exists, the data source ID manager may forward the request to that data source. In another embodiment, the data source ID manager may create data source proxies for each different data source specified by an application (e.g. according to each different abstract name for data resources used in the application. For each data source referenced by the application having matching data source IDs, the data source ID manager may configure the data source proxies as proxies to the same true data source. In this way, redundant connections may be eliminated through eliminating redundant data sources.

Figure 3:
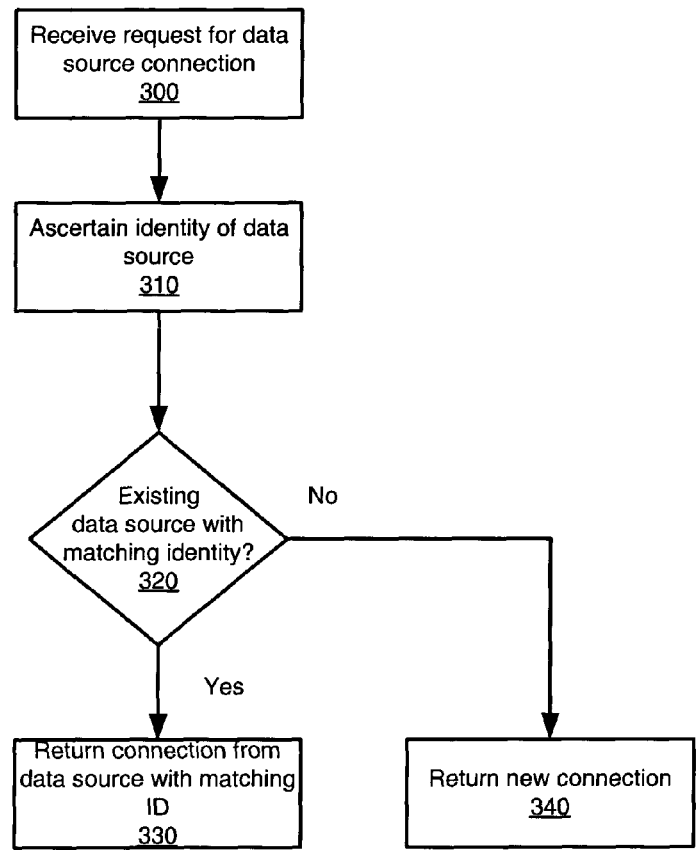
FIG. 3 is a flowchart of one embodiment of a method of operating a data source ID manager.

FIG. 3 is a flowchart of a method using data source IDs in an application server to improve efficiency of operation, according to one embodiment. At 300, an application may issue a request for a connection to a data resource. As depicted in block 310, a unique data source identity corresponding to the request may be ascertained. For example, data source property information may retrieved from a data source properties object. The data source ID may be based on the information or values for a predetermined set of the data source properties for the requested data source.

In decision block 320, the ascertained data source ID may be compared to data source IDs for other data sources in the application server. If a data source has already been established with a matching ID, a connection from the data source with a matching ID may be returned to the application, as shown in block 330. For example, the data source having a matching ID might have multiple connections pooled and the application server might choose any one of them to be returned. If no identity match is found at 320, a new connection may be obtained and returned to the application, as depicted at 340.

Figure 4:
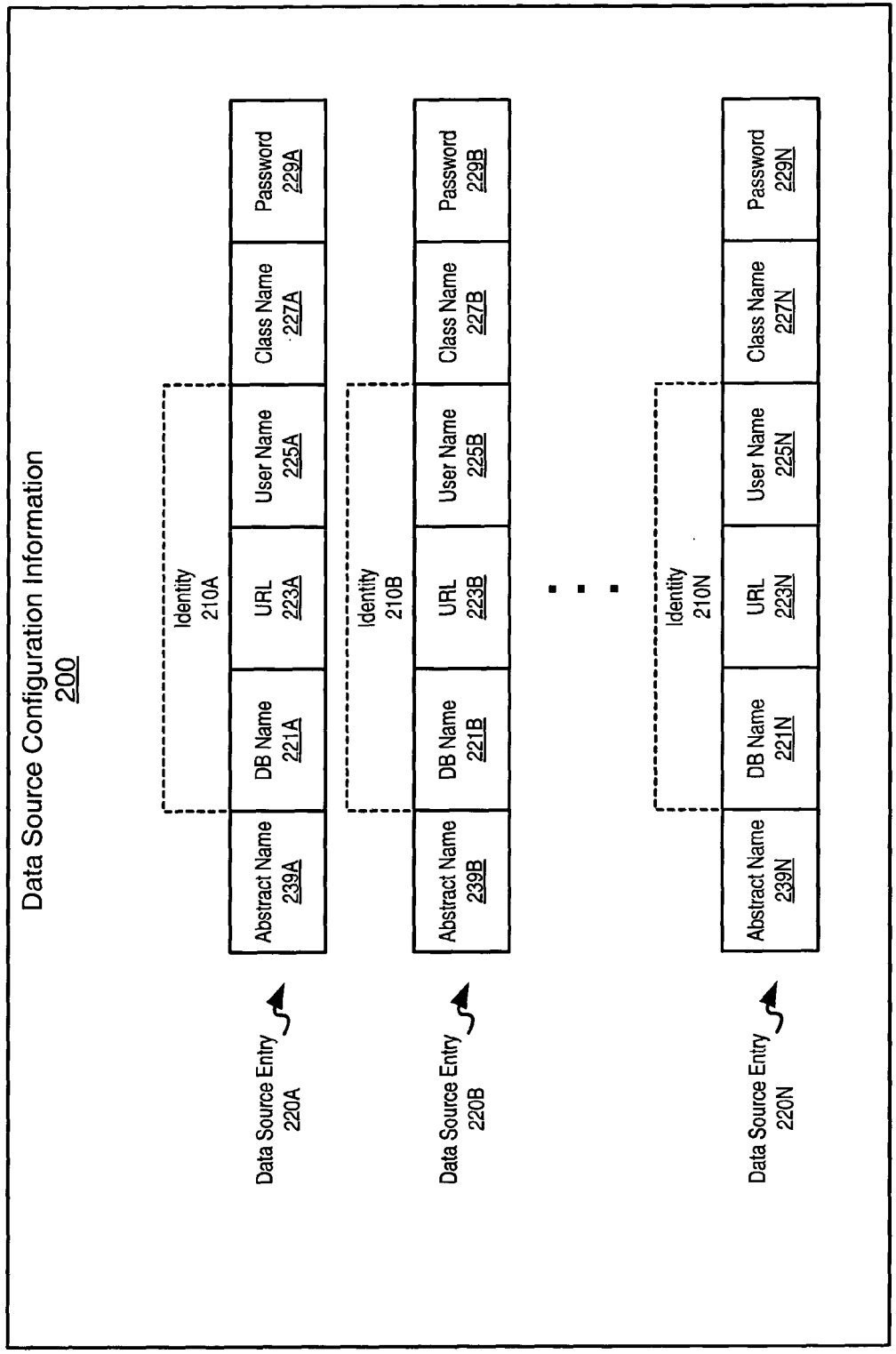
FIG. 4 illustrates a logical representation of data source configuration data, according to one embodiment.

FIG. 4 illustrates a logical representation of data source configuration properties 200, according to one embodiment. In any given implementation, data source configuration information 200 may not necessarily be stored in the format illustrated. An application running on an application server may require communications with various data resources such as databases. Some of these data resources may reside on backend systems networked to the application server. The application server may include configuration information to establish successful communications with each of the data resources with which the application interacts.

Data source configuration information 200 may include a plurality of data source entries 220. A data source entry may include the information needed to connect an application to a database that is managed by a database driver. Data source objects may work with a naming directory interface service in such a way that a connection may be instantiated and managed independently of the applications that use it. In this manner, connection information, such as path and port number, may be quickly changed in the properties of the data source object, without requiring code changes in the applications that use the data resource.

In some embodiments, data source configuration information 200 may be included in an object. This object may include one or more methods that receive requests for information included in data source entries 220. For example, an application or a component of an application server may need to retrieve data from a database residing on a backend system remote from the application server on which the application is running. The application server may be coupled to the backend system by a network. In order to access the required data, the application may need to establish a network connection with the database. In some cases, the application may only include an abstract designation or name for the desired database. The application may generate a request for information necessary to connect to the database. A function included in the object may use the abstract designation supplied by the application to identify and return property information from a corresponding data source entry 220.

Data source entry 220A may include a number of properties used to configure a data source, such as DB Name field 221A. DB Name field 221A may store a name for the database as provided by a naming directory interface service. URL field 223A may include the URL of the database. A URL is the address of a resource available on the Internet. The URL includes the protocol of the resource (e.g. http:// or ftp://), along with the domain name (IP address) and the hierarchical name for the resource. User Name field 225A may include a name that the database recognizes as being authorized to access and or modify data. Class Name field 227A may include specific information about the database driver associated with the database. Password field 229A may include information that the database may use to authenticate the user specified by User Name field 225A. Abstract Name field 239A may include a string of character data that serves as an alias for the database. The abstract name may allow an application programmer to easily associate the type of data stored in the database but may contain little or no information needed to instantiate a network connection with the database. Many other types and/or combinations of types of properties and/or information may be included in a data source entry 210.

Identity 210 may include a subset of the information fields of data source entry 210. Typically, data source configuration information 200 may include multiple data source entries 210 corresponding to a particular data resource. For example, different components of an application may access a data resource for different reasons and may refer to that data resource by different abstract designations 239. Data source configuration information 200 may include a data source entry 220 corresponding to each abstract designation included in an application. A data source ID manager may be configured to identify a subset of the information included in a data source entry 220 as the data source identity 220 for that data source entry. In some embodiments, a configuration utility may be provided by the application server to configure the data source properties. The configuration utility may also be used to specify the particular set of properties that should be used to identify a particular data source. Different sets of properties may be specified for different types of data source, e.g. from different vendors or for different types of backend data resource.

The data source entries 220 corresponding to a particular data resource may all include the same identity 210. In the illustrated embodiment, identity 210 may include the DB Name field 221, the URL field 223, and the User Name field 225. In other embodiments, the identity may include a greater or lesser number of information fields and/or other combinations of information fields included in the data source entry. The identity may incorporate less than all of the information included in an information field of the data source entry. The data source manager may combine and/or reorder entire information fields or portions of information fields included in the data source entry, in order to produce the data source identity 220. Regardless of format, the information included in the identity is sufficient to identify all data sources for a single data resource uniquely with respect to data sources for other data resources in a networked computer system.

An application server may use proxies in conjunction with data source identities in order to eliminate the instantiation of redundant data sources. When the application server is prepared to instantiate a data source associated with an abstract name, the data source ID manager may determine the identity of the data source. The data source ID manager may compare the identity of the data source to be instantiated with the identities of existing data sources. If no existing data source has a matching identity, the application server may proceed with the instantiation of the new data source. However, if a data source with a matching identity does exist, the application server may instantiate a proxy for the new data source in the naming directory space instead. The proxy for the new data source may receive connection requests intended for the new data source and route them to the existing data source with the matching identity. In this way the allocation of system resources to a redundant data source may be avoided.

Figure 5:
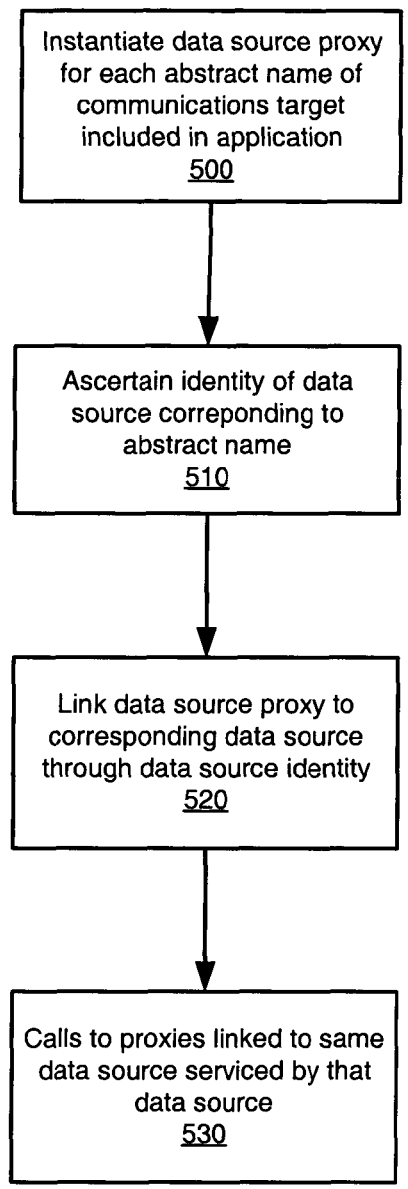
FIG. 5 is a flow chart of a method of configuring an application server, according to one embodiment.

FIG. 5 is a flow chart of a method of configuring an application server, according to one embodiment. At 500, a data source proxy may be instantiated corresponding to each data resource reference (e.g. abstract name) used in an application. Data source identities may be determined for each abstract data source reference in the application, as shown in block 510.

Each data source proxy may be linked to a data source with a matching identity, as illustrated at 520. For example, multiple abstract names for data resources included in an application may refer to the same data resource e.g. a particular database on a backend system. A single data source may be included in the application server to provide connections to that database. All data source proxies whose associated abstract names correspond to the identity of the data source may be linked to that data source. The application may then obtain a connection to the data resource using any abstract name linked to the data source, as illustrated at block 530.

In addition to conserving resources in the application server by eliminating redundant data sources, the association of identities with data sources may also improve the efficiency of transactions in multi-tier applications, as described below.

Some application programs, particularly business applications, may require that the results of sets of data modifying operations must be committed to permanent storage atomically, that is either together or not at all, in order for the data to remain consistent and to maintain data integrity. Such a set of operations may be referred to as a transaction. An application may designate operations to be included in a transaction by including a statement to initiate a transaction, designating an identity for the transaction, and concluding the operations included in the transactions with a command to commit the database operations to permanent storage.

An example of an application in which a transaction may be beneficial is a banking application in which funds are transferred from one account to another. The application may accomplish the transfer by performing a withdrawal from one account and a deposit to another account. If the withdrawal operation completes but the deposit operation does not, the first account may reflect and improper balance. Conversely, if the deposit operation completes, but the withdrawal fails, the second account may show an improper balance. In the case of such a set of interdependent operations, neither the withdrawal nor the deposit should complete unless both can complete. By including both the withdrawal and deposit operations in a transaction, the application may designate that the operations are required to complete atomically.

In some cases, a transaction may be limited in scope to operations, which modify data in only one database on a single backend system. Such operations may be referred to as local transactions and the database or backend resource manager may itself, manage such transactions using a single-phase commit protocol. In other instances, a transaction may span multiple databases, backend systems, and/or resource managers. These transactions may be referred to as distributed or global transactions. Global transactions may require transaction coordination by a transaction manager external to the backend systems involved in the transaction. The transaction manager may coordinate a global transaction using a two-phase commit protocol.

Figure 6:
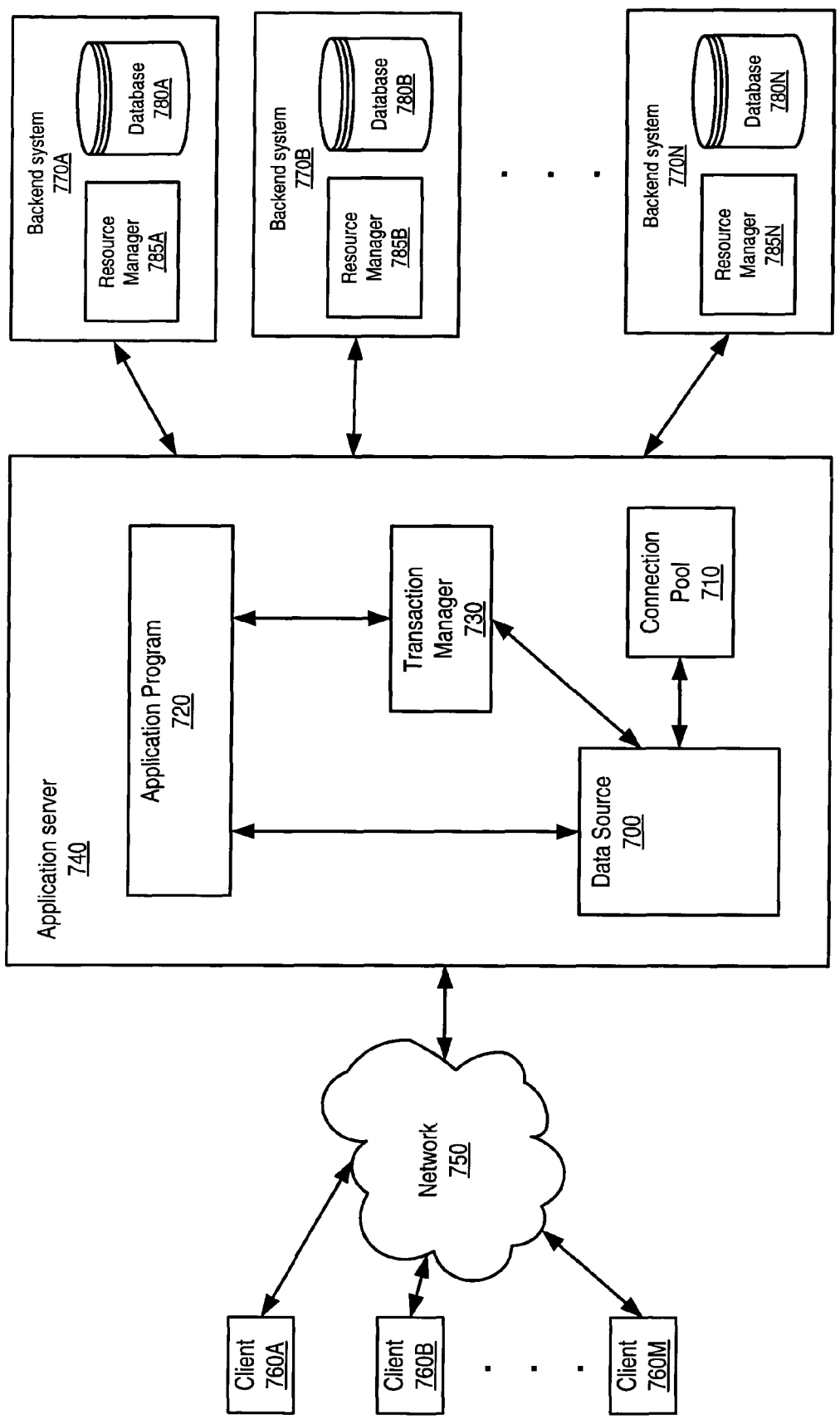
FIG. 6 illustrates components of a networked, transactional computer system, according to one embodiment.

FIG. 6 illustrates a networked computer system, according to one embodiment. The networked computer system may support the execution of three-tier applications. A three-tier application is an application that may be organized into three major parts, each of which may be distributed within a networked computer system. The three parts (tiers) may include: one or more clients 760, one or more servers 740, and one or more back-end systems 770 (e.g. databases) along with their management functions 785. In the first tier, a client may be a program running on a user's computer that includes a graphical user interface, application-specific entry forms, and/or interactive windows for interacting with an application. An exemplary client may be a web browser that allows a user to access the Internet. In the second tier, a server may be a program such as an application server that contains the business logic for an application such as banking transactions or purchasing merchandise for the user of a client. The server may be running on one or more computers.

A plurality of client systems may connect to one or more servers as components of a network 750. An exemplary network of this type is the Internet. Clients may submit requests to servers. In some instances a server 740 may be able to fulfill a request using only resources available within the server itself. In other cases, the server may need to access resources in other networked computer systems in order to fulfill the client's request. For example, server 740 may request data on the behalf of client 760 from a database 780 residing on a backend system 770. This request may require the establishment of a connection between the server 740 and a backend system 770. A connection is a set of computer system resources and parameters, which allows communications between two or more entities within the system.

The third tier of a three-tier application may include one or more backend systems 770. A backend system 770 may include one or more databases 780 and programs that facilitate access to the data they contain, designated resource managers 785. Databases on backend systems may be referred to as data sources. In order to perform a particular function, an application 720 may need to retrieve and/or alter data in multiple databases resident on multiple backend systems. A set of two or more related operations that must be coordinated together atomically may be referred to as a transaction. A transaction involving more than one data source may be referred to as a distributed or global transaction.

Figure 7:
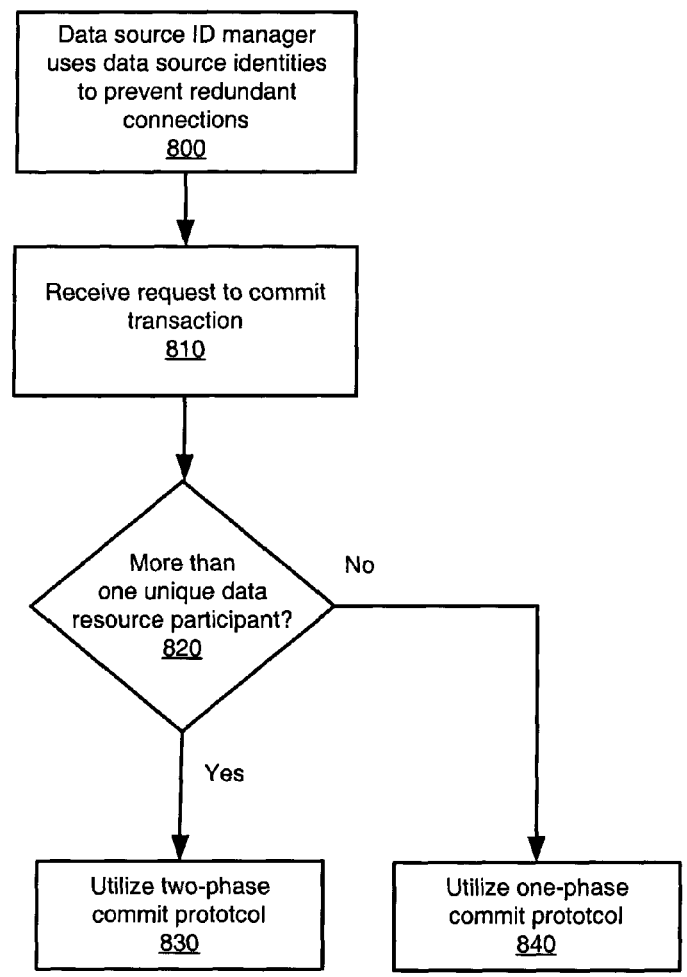
FIG. 7 is a flow chart of a method for operating a transaction manager, according to one embodiment.

FIG. 7 is a flow chart illustrating a method for transaction management, according to one embodiment. As illustrated by block 800, after a transaction has been initiated, the data source ID manager may determine identities of data sources supplying connections to transaction participants to ensure that redundant connections are avoided for communicating with any data resource participating in the transaction. At some point, the application may request that the transaction manager commit the state of the transaction, as indicated at block 810. As shown by decision block 820, the transaction manager may determine whether more than one unique data resource is participating in the transaction by checking the number of unique connections being used. If multiple unique data resources have been enlisted, the transaction manager may use a two-phase commit protocol to coordinate the transaction as indicated in block 830, whereas a one-phase commit optimization may be used for a transaction communicating with a single data resource, as shown at 840. For example, in the case where an application communicates with a single data resource using a plurality of abstract names, the data source ID manager may ensure that only a single connection is enlisted in the transaction. Thus, the transaction manager may coordinate the transaction as a local transaction rather than a global transaction. This may reduce the amount of resources and time needed to execute the transaction.

Figure 8:
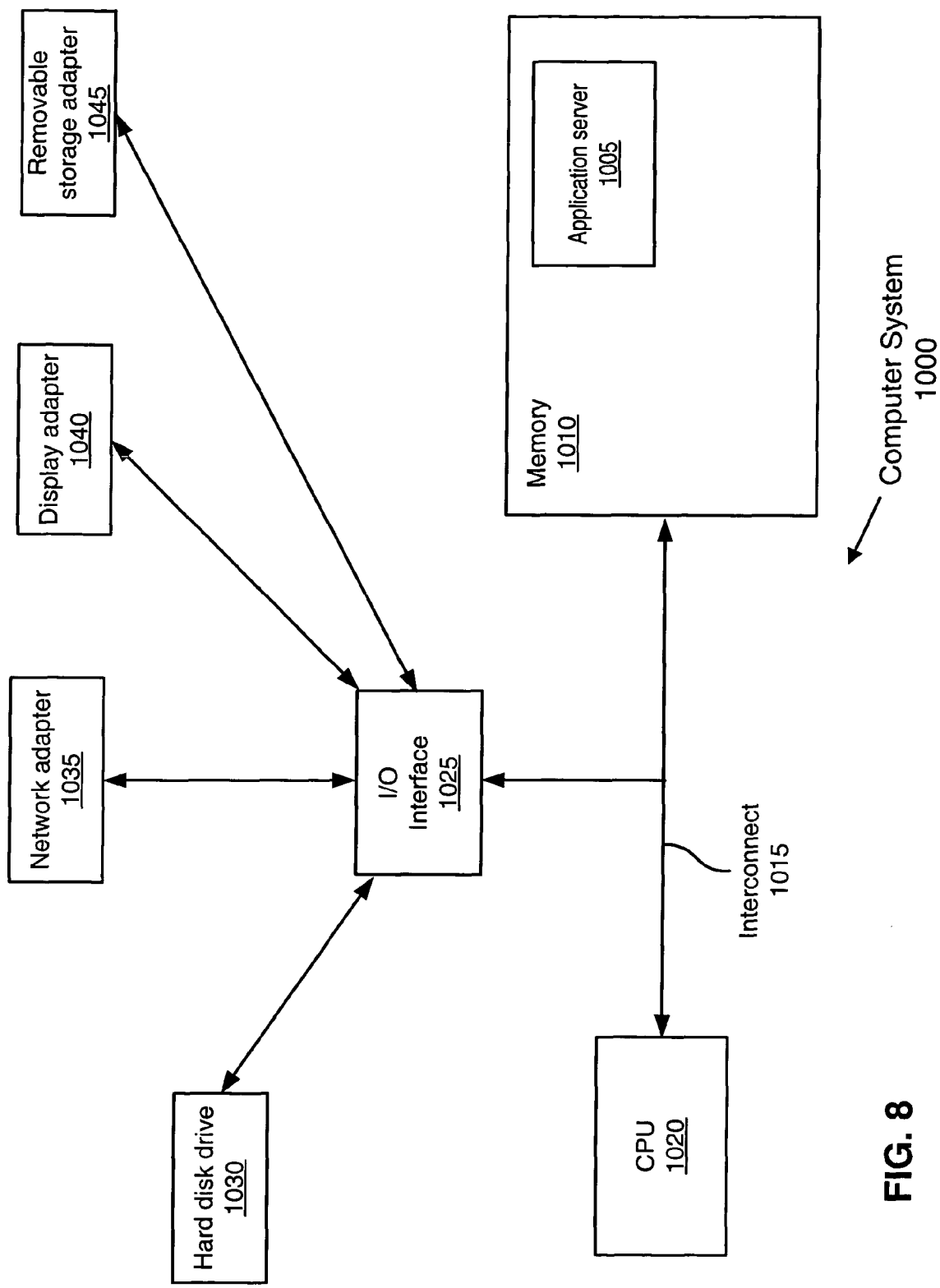
FIG. 8 illustrates an exemplary computer system, according to one embodiment.

FIG. 8 illustrates one embodiment of a computer system 1000 that may include an application server 1005 utilizing data source identities as described herein. Computer system 1000 may include many different components such as memory 1010, a central processing unit (CPU) or processor 1020, and an input/output (I/O) interface 1025. Interconnect 1015 is relied upon to communicate data from one component to another. For example, interconnect 1015 may be a point-to-point interconnect, a shared bus, a combination of point-to-point interconnects and one or more buses, and/or a bus hierarchy including a system bus, CPU bus, memory bus and I/O buses such as a peripheral component interconnect (PCI) bus.

The computer system 1000 preferably includes a memory medium on which computer programs according to various embodiments may be stored. The term "memory medium may include an installation medium, e.g., a CD-ROM, or floppy disk; a computer system memory such as DRAM, SRAM, EDO DRAM, SDRAM, DDR SDRAM, Rambus RAM, etc., or a non-volatile memory such as a magnetic media, e.g., a hard drive 1030, or optical storage. The memory medium may include other types of memory as well, or combinations thereof. In addition, the memory medium may be located in a first computer in which the programs are executed, or may be located in a second different computer, which connects to the first computer over a network. In the latter instance, the second computer provides the program instructions to the first computer for execution.

Also, the computer system 1000 may take various forms, including a personal computer system, mainframe computer system, workstation, network appliance, Internet appliance, personal digital assistant (PDA), television system or other device. In general, the term "computer system" can be broadly defined to encompass any device having a processor, which executes instructions from a memory medium. The memory medium preferably stores a software program or programs for event-triggered transaction processing as described herein. The software program(s) may be implemented in any of various ways, including procedure-based techniques, component-based techniques, and/or object-oriented techniques, among others. For example, the software program may be implemented using ActiveX controls, C++ objects, JavaBeans, Microsoft Foundation Classes (MFC), or other technologies or methodologies, as desired.

Memory 1010 may store program instructions accessed by the CPU 1020. For example, instructions and data implementing an application server 1005 may be stored in memory 1010. Application server 1005 may include one or more applications, data sources, data source proxies, transaction managers, and/or a data source ID manager.

Computer system 1000 may further include other software and hardware components, such as an input/output (I/O) interface 1025, that may be coupled to various other components and memory 1010. The CPU 1020 may acquire instructions and/or data through the I/O interface 1025. Through the I/O interface 1025, the CPU 1020 may also be coupled to one or more I/O components. As illustrated, I/O components may include a hard disk drive 1030, a network adapter 1035, a display adapter 1040 and/or a removable storage adapter 1045. Some components 1030 to 1045 may be coupled to the I/O interface 1025. In addition, the computer system 1000 may include one or more of a particular type of component. The computer system 1000 may include one or more components coupled to the system through a component other than the I/O interface 1025. Some computer systems may include additional and/or other components such as application software (e.g., stored in memory 1010), other CPUs, video monitors or other displays, track balls, mice, keyboards, printers, plotters, scanners, or other types of I/O devices for use with computer system 1000.

Various embodiments may further include receiving, sending or storing instructions and/or data implemented in accordance with the foregoing description upon a carrier medium. Generally speaking, a carrier medium may include storage media or memory media such as magnetic or optical media, e.g., disk or CD-ROM, volatile or non-volatile media such as RAM (e.g. SDRAM, DDR SDRAM, RDRAM, SRAM, etc.), ROM, etc. as well as transmission media or signals such as electrical, electromagnetic, or digital signals, conveyed via a communication medium such as network and/or a wireless link.

The various methods as illustrated in the figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
an application server; and
one or more of backend systems coupled to the application server;
wherein the one or more backend systems comprises a plurality of distinct data resources;
wherein the application server comprises:
an application configured to initiate requests for connections with the plurality of distinct data resources;
a plurality of data sources configured to provide connections with the plurality of distinct data resources; and
wherein the application server is configured to associate an identity with each of the plurality of data sources and to use the identity to determine whether one of the plurality of data sources provides connections to the same data resource as another of the plurality of data sources, wherein each identity is unique to one of the plurality of distinct data resources, and wherein multiple ones of the data sources have the same identity.

2. The system as recited in claim 1, wherein in response to the application requesting a connection from one of the plurality of data sources, a data source ID manager is configured to ascertain the identity of the data source from which the connection was requested and determine whether the identity matches the identity of any other of the plurality of data sources.

3. The system as recited in claim 2, wherein the data source ID manager is further configured to determine whether any of the data sources with matching identities previously supplied a connection to the application and, if a connection was previously supplied, to return the previously supplied connection to the application.

4. The system as recited in claim 3, wherein if no connection from a data source with a matching identity exists, the data source is configured to forward the request to a corresponding data source to obtain a new connection.

5. The system as recited in claim 4, wherein the connection is a local connection.

6. The system as recited in claim 1, wherein the identity comprises values for one or more data source properties.

7. The system as recited in claim 6, wherein the identity comprises database name, URL, and user name.

8. The system as recited in claim 1, wherein one or more of the plurality of data sources is a data source proxy, wherein the application server is configured to instantiate the data source proxy for an abstract name of a data resource used by an application; ascertain an identity for a true data source; and use the identity to link the proxy to the true data source.

9. The system as recited in claim 8, wherein multiple data source proxies correspond to the same data source identity, wherein in response to the application requesting connections with a same data resource from multiple data source proxies, the data source proxies from which the connections were requested are configured to forward the connection requests to the data source whose identity corresponds to said proxies.

10. The system as recited in claim 1, wherein in response to a request to instantiate a data source corresponding to an abstract name, the application server is configured to determine an identity for the proposed data source, determine whether any existing data source has a matching identity, instantiate the proposed data source only if no existing data source with matching identity is found.

11. The system as recited in claim 1, wherein the application server further comprises a transaction manager;
wherein in response to a request to commit a transaction the transaction manager is configured to identify a number of data resources participating in the transaction according to connections supplied for unique data source identities;
wherein if the number of data resources participating in the transaction is two or more the transaction manager is configured to commit the transaction utilizing a two-phase commit protocol; and
wherein if only one data resource participating in the transaction the transaction manager is configured to commit the transaction utilizing a one-phase commit optimization.

12. A method, comprising:
receiving notification of a request for a connection;
ascertaining an identity of a data source associated with the request, wherein the data source is configured to provide the connection to one of a plurality of distinct data resources, and wherein said identity is unique to said one of said plurality of distinct data resources;
comparing said identity with respective identities of multiple data sources with existing connections, wherein the identity of each of the multiple data sources is unique to a specific one of said plurality of distinct data resources;
providing an existing connection if an identity match is found with one of the data sources with existing connections; and
providing a new connection if no identity match is found.

13. The method as recited in claim 12, wherein the identity comprises values for one or more data source property.

14. The method as recited in claim 13, wherein the identity comprises database name, URL, and user name.

15. The method of claim 12, further comprising:
creating one or more data source proxies, wherein multiple data source proxies correspond to the same data source identity;
each data source proxy associated with the same data source identity forwarding connection requests to the same data source whose identity corresponds to said proxies.

16. The method of claim 12, further comprising:
in response to a request to commit a transaction, identifying the number of data resources participating in the transaction according to the number of unique data source identities used to establish data resource connections; and
if the number of data resources participating in the transaction is two or more, committing the transaction utilizing a two-phase commit protocol, and if only one data resource is participating in the transaction, committing the transaction utilizing a one-phase commit optimization.

17. A method, comprising:
receiving a request for a connection with a participant in a transaction;
ascertaining an identity of a local data source associated with the request;
attempting to identify a data source that is already participating in the transaction whose identity matches the identity of the data source associated with the request, wherein said attempting comprises comparing the ascertained identity to identities for a plurality of data sources, wherein each of the plurality of data sources is configured to provide a connection with one of a plurality of distinct data resources, and wherein each identity is unique to one of the plurality of distinct data resources;

sharing an existing connection associated with the identity if a data source with a matching identity is found; and providing a new connection if no data source with a matching identity is found.

18. A non-transitory computer accessible medium comprising program instructions, wherein the program instructions are computer-executable to:

receive notification of a request for a connection;

ascertain an identity of a data source associated with the request;

determine whether the identity of a data source from among a plurality of local and global data sources each having an existing connection matches the identity of a data source associated with the request, wherein each of the plurality of local and global data sources is configured to provide a connection with one of a plurality of distinct data resources, and wherein each of the plurality of local and global data sources has an identity unique to one of the plurality of distinct data resources;

provide the existing connection if an identity match is found; and provide a new connection if no identity match is found.

19. The non-transitory computer accessible medium as recited in claim 18, wherein the identity comprises values for one or more data source properties.

20. The non-transitory computer accessible medium as recited in claim 19, wherein the identity comprises database name, URL, and user name.

21. The non-transitory computer accessible medium as recited in claim 18, wherein the program instructions are further computer-executable to:

create one or more data source proxies, wherein multiple data source proxies correspond to the same data source identity;

wherein each data source proxy associated with the same data source identity forwards connection requests to the same data source whose identity corresponds to said proxies.

22. The non-transitory computer accessible medium as recited in claim 18, wherein the program instructions are further computer-executable to:

in response to a request to commit a transaction, identify the number of data resources participating in the transaction according to the number of unique data source identities used to establish data resource connections; and if the number of data resources participating in the transaction is two or more, commit the transaction utilizing a two-phase commit protocol, and if only one data resource is participating in the transaction, commit the transaction utilizing a one-phase commit optimization.

23. A non-transitory computer accessible medium comprising program instructions, wherein the program instructions are computer-executable to:

receive a request for a connection with a participant in a transaction;

ascertain an identity of a local data source associated with the request;

attempt to identify a data source that is already participating in the transaction whose identity matches the identity of the data source associated with the request, wherein to attempt to identify comprises comparing the ascertained identity to identities for a plurality of data sources, wherein each of the plurality of data sources is configured to provide a connection with one of a plurality of distinct data resources, and wherein each identity is unique to one of the plurality of distinct data resources;

share an existing connection associated with the identity if a data source with matching identity is found; and provide a new connection if no data source with matching identity is found.

* * * * *